United States Patent
Buford et al.

(10) Patent No.: US 8,300,558 B2
(45) Date of Patent: Oct. 30, 2012

(54) FEATURE INTERACTION DETECTION IN MULTI-PARTY CALLS AND CALLS WITH BRIDGED APPEARANCES

(75) Inventors: John Buford, Princeton, NJ (US); Mario Kolberg, Glasgow (GB); Venkatesh Krishnaswamy, Holmdel, NJ (US); Krishna Kishore Dhara, Dayton, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 919 days.

(21) Appl. No.: 12/392,429

(22) Filed: Feb. 25, 2009

(65) Prior Publication Data
US 2010/0182938 A1 Jul. 22, 2010

Related U.S. Application Data

(60) Provisional application No. 61/145,700, filed on Jan. 19, 2009.

(51) Int. Cl.
*H04L 11/00* (2006.01)
(52) U.S. Cl. ............ 370/260; 370/270; 379/207.02
(58) Field of Classification Search .......... 370/259, 370/260, 261, 270; 379/159, 165, 207.02
See application file for complete search history.

(56) References Cited

U.S. PATENT DOCUMENTS

| | | | |
|---|---|---|---|
| 5,337,351 A | 8/1994 | Manabe et al. | |
| 6,418,215 B1 | 7/2002 | Schessel | |
| 6,639,980 B1 | 10/2003 | Weiss et al. | |
| 6,714,634 B1 | 3/2004 | Breeden | |
| 7,050,563 B2 | 5/2006 | Dammrose | |
| 7,076,766 B2 | 7/2006 | Wirts et al. | |
| 7,542,768 B2 | 6/2009 | Florkey et al. | |
| 7,548,967 B2 | 6/2009 | Amyot et al. | |
| 7,720,976 B2 | 5/2010 | Chu et al. | |
| 7,782,897 B1 | 8/2010 | Mohaban | |

(Continued)

FOREIGN PATENT DOCUMENTS

GB 2353916 A 3/2001

OTHER PUBLICATIONS

Chentouf et al., "Experimenting with Feature Interaction Management in SIP Environment", "http://www.google.com/#sclient=psy&hl=en&q=Experimenting+with+Feature+Interaction+Management+in+SIP+Environment&aqi=&aql=&oq=&pbx=1&fp=8ce0e008a607e93", 2003, pp. 251-274, vol. 24, No. 2-4, Publisher: Kluwer Academic Publishers.

(Continued)

*Primary Examiner* — Andrew Lee

(57) ABSTRACT

A method is disclosed for detecting feature interactions in multi-party calls (i.e., calls involving more than two endpoints), and in calls with bridged appearances. In accordance with the illustrative embodiment, a set of rules is applied to the specifications of two features in order to detect interactions between the features. The rules specify conditions for, or relationships among, the original connections for the features, the resulting connections for the features, the triggering party for the features, and the originating and terminating parties of connections. A rule is considered matched for a multi-party call when any of the original and resulting connections for the call match the conditions of the rule. Similarly, a rule is considered matched for a call with one or more bridged appearances when any of the original and resulting connections for the call, including those of bridged appearances, match the conditions of the rule.

6 Claims, 9 Drawing Sheets

U.S. PATENT DOCUMENTS

| | | | |
|---|---|---|---|
| 7,788,408 | B2 | 8/2010 | Takeda et al. |
| 7,804,818 | B1 | 9/2010 | Atluri et al. |
| 7,907,712 | B2 * | 3/2011 | Goguen et al. ........... 379/201.01 |
| 2003/0059015 | A1 | 3/2003 | Eber et al. |
| 2003/0108182 | A1 * | 6/2003 | Dikmen ........................ 379/229 |
| 2003/0120502 | A1 | 6/2003 | Robb et al. |
| 2004/0153875 | A1 | 8/2004 | Amyot et al. |
| 2005/0148362 | A1 | 7/2005 | Jagadeesan et al. |
| 2006/0093115 | A1 | 5/2006 | Chen et al. |
| 2006/0218268 | A1 | 9/2006 | Beck et al. |
| 2006/0268678 | A1 * | 11/2006 | Dhesikan et al. ............. 370/216 |
| 2007/0004410 | A1 * | 1/2007 | Goldman et al. ............. 455/436 |
| 2007/0005770 | A1 | 1/2007 | Kramer et al. |
| 2007/0224997 | A1 | 9/2007 | Florkey et al. |
| 2008/0052400 | A1 | 2/2008 | Ekberg |
| 2008/0220775 | A1 | 9/2008 | Tischer et al. |
| 2009/0191870 | A1 | 7/2009 | Siegel et al. |
| 2010/0008232 | A1 | 1/2010 | Zave |

OTHER PUBLICATIONS

Chou et al., "Web Services Methods for Communication over IP", "http://www.google.com/#sclient=psy&hl=en&q=Web+Services+Methods+for+Communication+over+IP+&aq=f&aqi=g-v1g-01&aql=&oq=&pbx=1&fp=8ce0e008a607e93d>", Jul. 2007, pp. 372-379, Publisher: IEEE Computer Society IEEE International Conference on Web Services (ICWS 2007).

Copenheaver, Blaine R., "PCT Application No. PCT/US2010/040435 International Search Report Feb. 8, 2011", , Publisher: PCT, Published in: PCT.

Duong, Duc T., "U.S. Appl. No. 12/392,461 Office Action Mar. 17, 2011", , Publisher: USPTO, Published in: US.

Duong, Duc T., "U.S. Appl. No. 12/392,461 Office Action Oct. 8, 2010", , Publisher: USPTO, Published in: US.

Domingos, Luis, "EP Application No. 09171159.8 European Search Report Jun. 14, 2010", , Publisher: EPO, Published in: EP.

Marjou et al., "Best Current Practices for a Session Initiation Protocol (SIP) Transparent Back-To-Back User-Agent (B2BUA)", "SIPPING Working Group Internet Draft XP015051976", Jul. 9, 2007, Publisher: Internet Engineering Task Force.

Beck et al., "Extending Service Mediation to Intelligent VoIP Endpoints", "Bell Labs Technical Journal 2005 XP001540855", , pp. 11-15, vol. 10, No. 1, Publisher: Wiley Periodicals, Inc.

Tsang et al, "The feature interaction problem in networked multimedia services—present and future", "BT Technology Journal XP000688223", Jan. 1997, vol. 15, No. 1, Publisher: Springer.

Buford et al., "Feature Interactions in P2P Overlay Networks", "IEEE Consumer Communications and Networking Conference XP031211883", Jan. 1, 2008, pp. 304-305, Publisher: IEEE.

Chiang et al., "Handling Feature Interactions for Multi-Party Services in 3GPP IP Multimedia Subsystem", "International Conference on IP Multimedia Subsystem Architecture and Applications XP031283340", Dec. 6, 2007, pp. 1-5.

Kolberg et al., "Managing Distributed Feature Interactions in Enterprise SIP Application Servers", "IEEE International Conference on Communications XP031506136", Jun. 14, 2009, pp. 1-6, Publisher: IEEE.

Kolberg et al., "Managing feature interactions between distributed SIP call control services", "Computer Networks www.elsevier.com/locate/comnet XP005758516", Nov. 10, 2006, pp. 536-557, vol. 51, No. 2, Publisher: Elsevier Science Publishers B.V. Amsterdam.

Gouya et al., "Service Broker for Managing Feature Interactions in IP Multimedia Subsystem", "Proceedings of the Sixth International Conference on Networking (ICN '07) XP031214505", Apr. 22, 2007, p. 54 Publisher: IEEE.

Domingos, Luis, "EP Application No. 09171163.0 European Search Report Jun. 14, 2010", , Publisher: EPO, Published in: EP.

Domingos, Luis, "EP Application No. 09171158.0 European Search Report Jun. 11, 2010", Publisher: EPO, Published in: EP.

* cited by examiner

FEATURE INTERACTION DETECTION IN MULTI-PARTY CALLS AND CALLS WITH BRIDGED APPEARANCES

CROSS-REFERENCE TO RELATED APPLICATIONS

This application is related to U.S. patent application Ser. No. 12/392,445 entitled "Mid-Call Detection And Resolution Of Feature Interactions" and U.S. patent application Ser. No. 12/392,461 entitled "Feature Interaction Detection During Calls With Multiple-Leg Signaling Paths", both of which were filed on the same day as the present application.

FIELD OF THE INVENTION

The present invention relates to telecommunications in general, and, more particularly, to detecting feature interactions in multi-party calls and calls with bridged appearances.

BACKGROUND OF THE INVENTION

Over the years a wide variety of telecommunications features (also referred to as services) have been developed over the years, such as call forwarding, three-way calling, music on hold, and so forth. When two or more features are applied to a telephone call, however, it is possible that an interaction between the features might cause unexpected or unwanted behavior, such as permitting policies to be circumvented or causing the call to fail. For example, suppose a call is set up via a meet-me conferencing feature, and then a music-on-hold feature is activated during the call. If one of the call participants goes on hold, then all of the other parties on the call will also hear the music.

Typically vendors of telephony platforms attempt to anticipate feature interactions at design time. The limitation of design-time techniques, however, is that it is difficult to anticipate feature interactions that might occur if one or more third parties add new features beyond those in the platform vendor's design. Run-time feature interaction detection and resolution techniques, meanwhile, typically rely on detailed models that can be difficult to maintain in distributed networked environments and can introduce calculation overhead that is infeasible to process during call setup.

SUMMARY OF THE INVENTION

The present invention provides a technique for detecting feature interactions in multi-party calls (i.e., calls involving more than two endpoints), and in calls with bridged appearances. In accordance with the illustrative embodiment, a set of rules is applied to the specifications of two features in order to detect interactions between the features. In particular, the rules specify conditions for, or relationships among, one or more of the following:
  the set of original connections for the first feature (i.e., the set of connections before the first feature is applied),
  the set of resulting connections for the first feature (i.e., the set of connections after the first feature is applied),
  the triggering party for the first feature (i.e., the identity of the endpoint that triggers activation of the first feature),
  the originating party of an original connection of the first feature,
  the terminating party of an original connection of the first feature,
  the originating party of a resulting connection of the first feature,
  the terminating party of a resulting connection of the first feature,
  the set of original connections for the second feature,
  the set of resulting connections for the second feature,
  the triggering party for the second feature,
  the originating party of an original connection of the second feature,
  the terminating party of an original connection of the second feature,
  the originating party of a resulting connection of the second feature, and the terminating party of a resulting connection of the second feature.

If two features are found to match any of the rules, then there is an interaction between the features. A rule is considered matched for a multi-party call when any of the original and resulting connections for the call match the conditions of the rule. Similarly, a rule is considered matched for a call with one or more bridged appearances when any of the original and resulting connections for the call, including those of bridged appearances, match the conditions of the rule.

The illustrative embodiment comprises: determining whether a first feature for a call that involves more than two endpoints and a second feature for the call interact.

DETAILED DESCRIPTION

Figure 1:
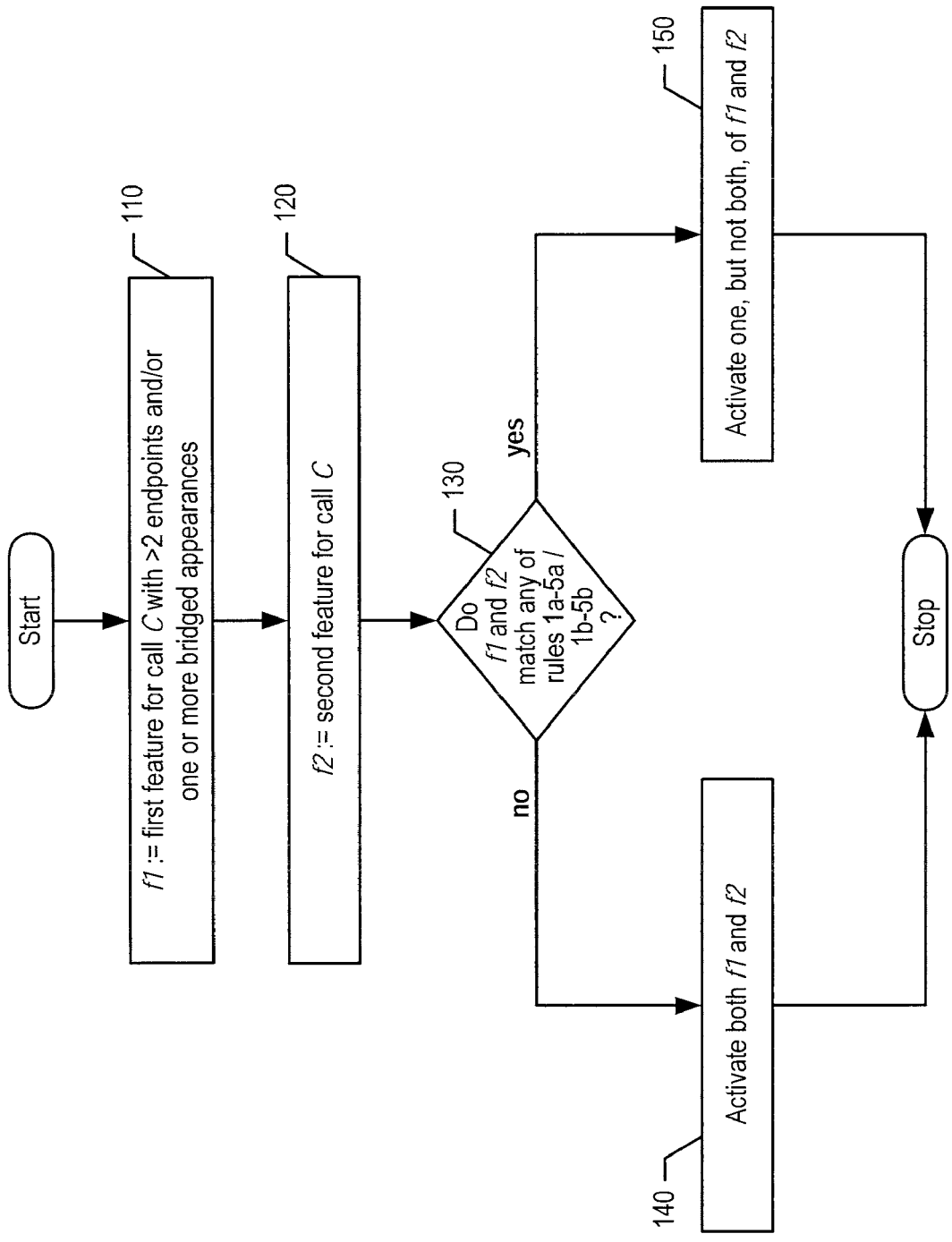
FIG. 1 depicts a flowchart corresponding to a method of detecting and resolving feature interactions for multi-party and bridged-appearance calls, in accordance with the first illustrative embodiment of the present invention.

The terms appearing below are given the following definitions for use in this Description and the appended Claims.

For the purposes of the specification and claims, the term "call" is defined as an interactive communication involving one or more telecommunications terminal users. A call might be a conventional voice telephone call, a Voice over Internet Protocol (VoIP) call, a Session Initiation Protocol (SIP) session, an instant messaging (IM) session, a video conference, etc.

In accordance with the first illustrative embodiment of the present invention, five basic rules are employed for detecting feature interactions, each with one variant for multi-party calls and one variant for calls with bridged appearances. Some of these rules deal with treatments, which are announcement or tones that are triggered by the network to handle certain conditions during a call (e.g., when a call is screened, when a call is blocked, etc.). Potentially, there might be multiple treatments involved in a particular call. For example, one feature might connect a party to a busy treatment during a call, while a second feature connects a party (either the same party or another party) to a network unavailable treatment during the same call.

In accordance with the first illustrative embodiment, notation is employed to precisely describe the behavior of features, which has the added benefit of facilitating automated rule-matching. As an example of this notation, the feature "call forwarding", or "CFU" for short, can be represented with this notation as follows:

CFU: TP: C; A,C→A,B where
- "TP: C" means that endpoint C is the triggering party (i.e., the endpoint at which the feature is activated);
- "A,C" on the left-hand side of the arrow means that there is an original connection between endpoints A and C (i.e., a connection between A and C prior to activation of the feature); and
- "A,B" on the right-hand side of the arrow means that there is a resulting connection between endpoints A and B (i.e., a connection between A and B after activation of the feature).

As another example, the feature "multi-party call join", or "Confjoin" for short, can be represented with this notation as follows:

Confjoin: TP: A; [A,C] A,B→A,B,C where
- "TP: A" means that endpoint A is the triggering party;
- "[A,C]" on the left-hand side of the arrow means that there is an original connection between endpoints A and C that has been put on hold;
- "A,B" on the left-hand side of the arrow means that there is an original connection between endpoints A and B;
- "A,B,C" on the right-hand side of the arrow means that there are resulting connections between endpoints A, B, and C (i.e., resulting connections between A and B, A and C, and B and C).

MULTI-PARTY CALLS

Rule 1a for multi-party calls
IF
  Feature1 and Feature2 have same triggering party
  AND
  (resulting connections of Feature1 = resulting connections of Feature2
    OR
  original connections of Feature1 = original connections of Feature2)
THEN
  Feature1 and Feature2 interact.
Rule 2a for multi-party calls
IF
  original connections of Feature1 = resulting connections of Feature2
  AND
  original connections of Feature2 = resulting connections of Feature1

MULTI-PARTY CALLS (continued)

THEN
  Feature1 and Feature2 interact.
Rule 3a for multi-party calls
IF
  Feature2 connects to a treatment
  AND
  {resulting connections of Feature1} ∩ {original connections of Feature2}
    ≠ φ
  AND
  ∃X ∈ {original connections of Feature1}
  ∃Y ∈ {resulting connections of Feature1} |
    [originating party(X) = originating party(Y) ∧
     terminating party(X) ≠ terminating party(Y)]
    OR
    [originating party(X) = terminating party(Y) ∧
    originating party(Y) = terminating party(X)]
THEN
  Feature1 and Feature2 interact.
Rule 4a for multi-party calls
IF
  {resulting connections of Feature1} ∩ {original connections of Feature2}
    ≠ φ
  AND
  [∃X ∈ {original connections of Feature1}
    ∃Y ∈ {resulting connections of Feature1} |
     [originating party(X) = terminating party(Y) ∧
     originating party(Y) = terminating party(X)] ]
  OR
  [∃X ∈ {original connections of Feature2}
    ∃Y ∈ {resulting connections of Feature2} |
     [originating party(X) = originating party(Y) ∧
     terminating party(X) ≠ terminating party(Y)] ]
THEN
  Feature1 and Feature2 interact.
Rule 5a for multi-party calls
IF
  original connections of Feature1 = original connections of Feature2
  AND
  [∃X ∈ {original connections of Feature1}
    ∃Y ∈ {resulting connections of Feature1} |
     [terminating party(Y) = treatment ∧
     originating party(X) = triggering party(Feature1)] ]
  OR
  [∃X ∈ {original connections of Feature2}
    ∃Y ∈ {resulting connections of Feature2} |
     [terminating party(Y) = treatment ∧
     originating party(X) = triggering party(Feature2)] ]
THEN
  Feature1 and Feature2 interact.

Bridged Appearances (BAs)

If an endpoint A calls an endpoint B, and B is already on a bridged appearance with an endpoint C, then A gets connected to B, with C also connected. Similarly, if endpoint B calls endpoint A, and B is already on a bridged appearance with endpoint C, then the same connections result with originating and terminating parties reversed. Using notation, the first case can be represented as:

BA: TP: B; A,B→A, B-C where "B-C" indicates that B is on a bridged appearance with C, and the second case can be represented as:

BA: TP: B; B,A→B-C, A

The following rules can detect interaction of two features for calls in which a bridged appearance is already present. In other words, these rules detect when there is an interaction between two features that are applied after the activation of a BA feature.

---

Rule 1b for calls with one or more BAs: same as Rule 1a
IF
    Feature1 and Feature2 have same triggering party
    AND
    (resulting connections of Feature1 = resulting connections of Feature2
      OR
    original connections of Feature1 = original connections of Feature2)
THEN
    Feature1 and Feature2 interact.
Rule 2b for calls with one or more BAs: same as Rule 2a
IF
    original connections of Feature1 = resulting connections of Feature2
    AND
    original connections of Feature2 = resulting connections of Feature1
THEN
    Feature1 and Feature2 interact.
Rule 3b for calls with one or more BAs
IF
    Feature2 connects to treatment
    AND
    {resulting connections of Feature1, including parties on BAs} ∩
    {original connections of Feature2, including parties on BAs}
      ≠ φ
    AND
    ∃X ∈ {original connections of Feature1, including parties on BAs}
    ∃Y ∈ {resulting connections of Feature1, including parties on BAs} |
      [originating party(X) = originating party(Y) ∧
      terminating party(X) ≠ terminating party(Y)]
      OR
      [originating party(X) = terminating party(Y) ∧
      originating party(Y) = terminating party(X)]
THEN
    Feature1 and Feature2 interact.
Rule 4b for calls with one or more BAs
IF
    {resulting connections of Feature1, including parties on BAs} ∩
    {original connections of Feature2, including parties on BAs}
      ≠ φ
    AND
    [∃X ∈ {original connections of Feature1, including parties on BAs}
      ∃Y ∈ {resulting connections of Feature1, including parties on
        BAs} | [originating party(X) = terminating party(Y) ∧
        originating party(Y) = terminating party(X)] ]
    OR
    [∃X ∈ {original connections of Feature2, including parties on BAs}
      ∃Y ∈ {resulting connections of Feature2, including parties on
        BAs} | [originating party(X) = originating party(Y) ∧
        terminating party(X) ≠ terminating party(Y)] ]
THEN
    Feature1 and Feature2 interact.
Rule 5b for calls with one or more BAs
IF
    original connections of Feature1 = original connections of Feature2
    AND
    [∃X ∈ {original connections of Feature1, including parties on BAs }
      ∃Y ∈ {resulting connections of Feature1, including parties on
        BAs } | [terminating party(Y) = treatment ∧
        originating party(X) = triggering party(Feature1)] ]
    OR
    [∃X ∈ {original connections of Feature2, including parties on BAs }
      ∃Y ∈ {resulting connections of Feature2, including parties on
        BAs } | [terminating party(Y) = treatment ∧
        originating party(X) = triggering party(Feature2)] ]
THEN
    Feature1 and Feature2 interact.

---

FIG. 1 depicts a flowchart of a method for detecting and resolving feature interactions for multi-party and bridged-appearance calls, in accordance with the first illustrative embodiment of the present invention. It will be clear to those skilled in the art, after reading this disclosure, which tasks depicted in FIG. 1 can be performed simultaneously or in a different order than that depicted.

At task 110, feature f1 is initialized to a first feature for a call C that has more than two endpoints, or one or more bridged appearances, or both.

At task 120, feature f2 is initialized to a second feature for call C.

Task 130 determines whether features f1 and f2 match any of rules 1a-5a and rules 1b-5b. As will be appreciated by those skilled in the art, there are a variety of ways well-known in the art for performing such a determination, such as a rule-matching engine of an expert system, a logic program, a constraint-satisfaction system, a naïve brute-force search, etc., and it will be clear to those skilled in the art, after reading this disclosure, how to make and use embodiments of the present invention that are capable of performing task 130.

If task 130 determines that no rules match features f1 and f2, then execution proceeds to task 140, otherwise execution continues at task 150.

At task 140, both features f1 and f2, are activated, in well-known fashion. After task 140, execution of the method of FIG. 1 terminates.

At task 150, one, but not both, of features f1 and f2 are activated, in well-known fashion. As will be appreciated by those skilled in the art, there are a variety of ways in which task 150 might select one of the two features for activation (i.e., in which task 150 performs feature interaction resolution). For example, in some embodiments of the present invention, task 150 might deterministically select the feature that was invoked first, while in some other embodiments of the present invention, task 150 might deterministically select the feature that was invoked last, while in still some other embodiments, some other method of resolution—such as those described below and with respect to the second illustrative embodiment and FIGS. 2 through 6—might be performed. In any case, it will be clear to those skilled in the art, after reading this disclosure, how to make and use embodiments of the present invention that are capable of performing task 150.

After task 150, execution of the method of FIG. 1 terminates.

As will be appreciated by those skilled in the art, the method of FIG. 1 can be implemented in conjunction with a variety of telephony platforms and protocols (e.g., Voice over Internet Protocol [VoIP] telephony based on the Session Initiation Protocol [SIP], conventional circuit-switched telephony via the Public Switched Telephone Network [PSTN], etc.), and it will be clear to those skilled in the art, after reading this disclosure, how to make and use embodiments of the present invention based on this method for such platforms and protocols.

Mid-Call Feature Interaction Detection and Resolution

The second illustrative embodiment of the present invention enables the detection and resolution of feature interactions during a call (i.e., mid-call feature interaction detection and resolution). The techniques of the second illustrative embodiment can be combined with those of the first illustrative embodiment in order to provide mid-call feature interaction detection and resolution for multi-party calls and calls with bridged appearances.

Figure 2:
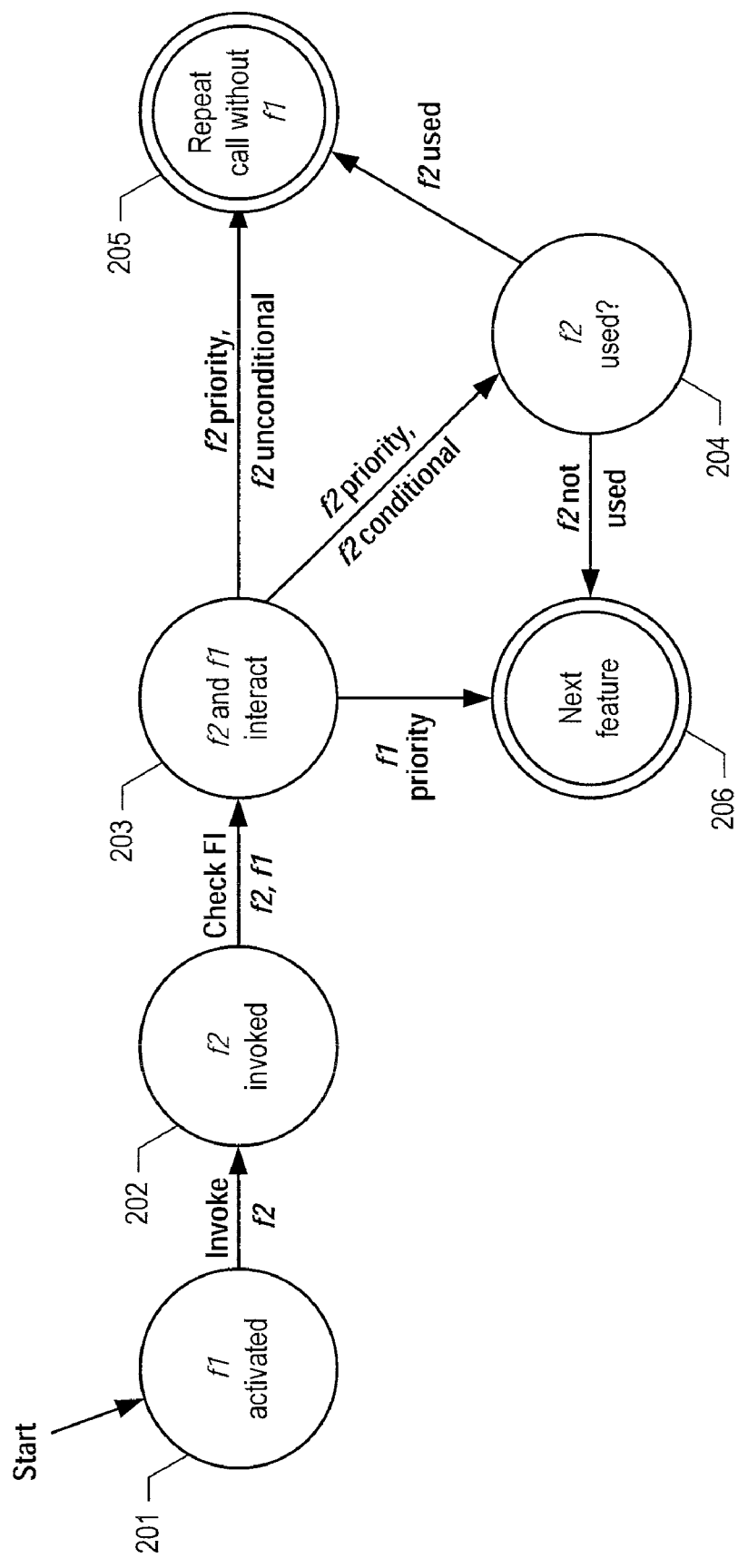
FIG. 2 depicts a finite-state machine for detecting and resolving feature interactions during a call, in accordance with the second illustrative embodiment of the present invention.

FIG. 2 depicts finite-state machine (FSM) 200 for detecting and resolving feature interactions during a call, in accordance with the second illustrative embodiment of the present invention. As shown in FIG. 2, finite-state machine (FSM) 200 comprises states 201 through 206, where state 201 is the starting state and states 205 and 206 are final states. Each arc (or directed edge) in finite-state machine (FSM) 200 indicates a legal transition from a first state to a second state, where the label on the arc provides a description of the transition.

At start state 201, feature f1 is activated. In some embodiments of the present invention, start state 201 might be entered before call setup, while in some other embodiments, start state 201 might be entered during call setup, while in still some other embodiments start state 201 might be entered after call setup during the call.

When a feature f2 is invoked during the call, finite-state machine (FSM) 200 leaves start state 201 and enters state 202.

At state 202, an interaction check for features f1 and f2 is performed. If there is an interaction, then finite-state machine (FSM) 200 leaves state 202 and enters state 203.

State 203 transitions to one of states 204, 205, and 206, depending on whether feature f1 or feature f2 has higher priority. (Feature priorities and resolution techniques for selecting one of features f1 and f2 are described in detail below and with respect to FIGS. 3 through 6). If feature f1 has priority over feature f2, then state 203 transitions to state 206. If feature f2 has priority over feature f1 and feature f2 is conditional, then state 203 transitions to state 204. If feature f2 has priority over feature f1 and feature f2 is unconditional, then state 203 transitions to state 205.

At state 204, a check for whether feature f2 is used is performed. If it is used, then state 204 transitions to state 205, otherwise state 204 transitions to state 206.

At final state 205, the call is repeated without feature f1.

At final state 206, the next feature is processed.

Figure 3:
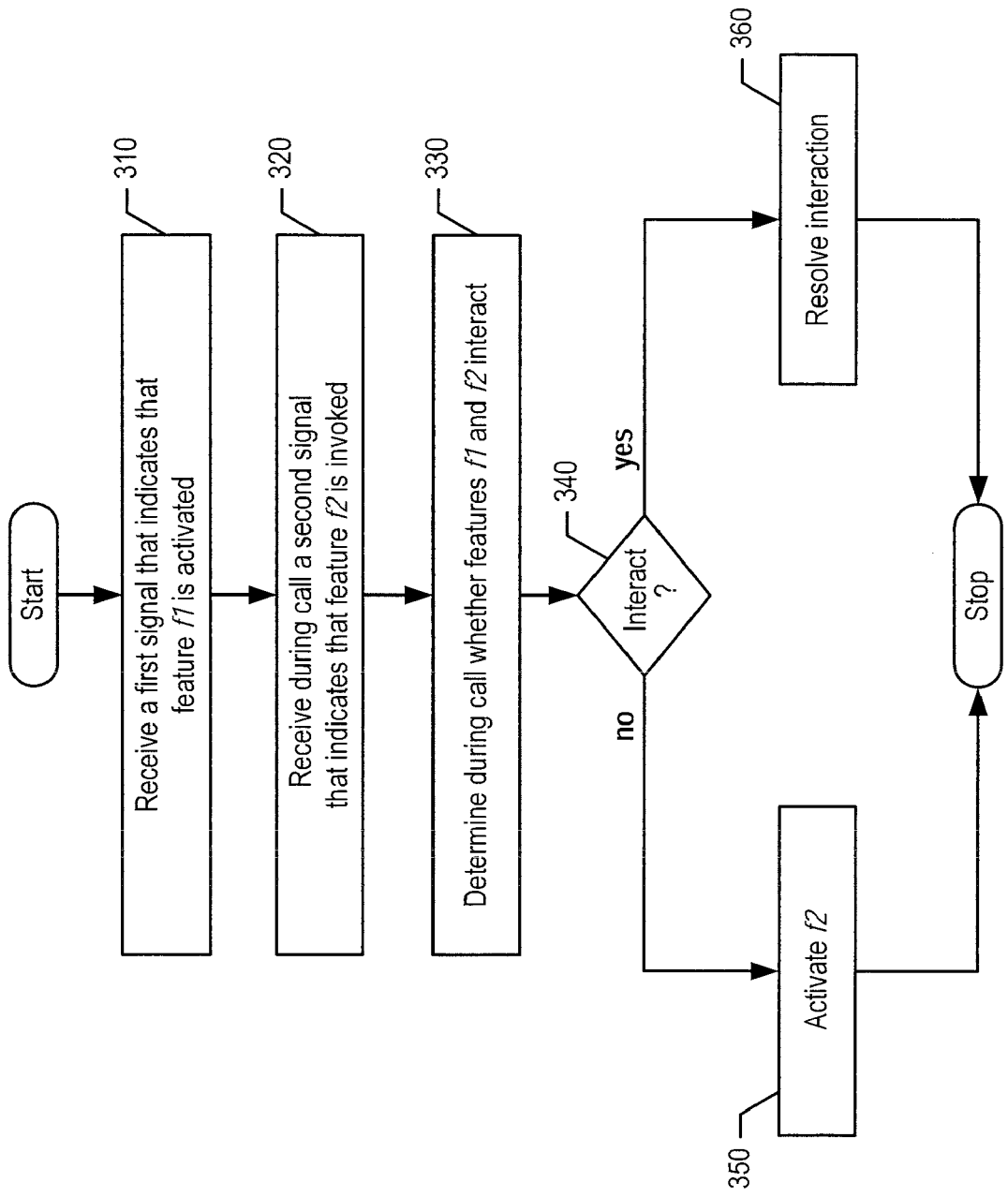
FIG. 3 depicts a flowchart for a method corresponding to finite-state machine 200, as shown in FIG. 2, in accordance with the second illustrative embodiment of the present invention.

FIG. 3 depicts a flowchart for a method corresponding to finite-state machine (FSM) 200, in accordance with the second illustrative embodiment of the present invention. It will be clear to those skilled in the art, after reading this disclosure, which tasks depicted in FIG. 3 can be performed simultaneously or in a different order than that depicted.

At task 310, a first signal is received that indicates that a feature f1 is activated, in well-known fashion. As will be appreciated by those skilled in the art, in some embodiments of the present invention this first signal might be received by a switch, while in some other embodiments this first signal might be received by a private branch exchange (PBX), while in still some other embodiments this first signal might be received from some other data-processing system. As will further be appreciated by those skilled in the art, in some embodiments of the present invention feature f1 might be activated at task 310 prior to the placing of a particular call, while in some other embodiments, feature f1 might be activated during a particular call. In any case, it will be clear to those skilled in the art, after reading this disclosure, how to make and use embodiments of the present invention that are capable of performing task 310.

At task 320, a second signal is received during a call, where the second signal indicates that a feature f2 is invoked during the call.

Task 330 determines, during the call, whether features f1 and f2 interact. As will be appreciated by those skilled in the art, there are a variety of ways in which the feature interaction might be detected. For example, in some embodiments of the present invention, feature interaction might be determined via the set of rules of the first illustrative embodiment, while in some other embodiments, feature interaction detection might be performed via some alternative technique. In any case, it will be clear to those skilled in the art, after reading this disclosure, how to make and use embodiments of the present invention that are capable of performing task 330.

Task 340 branches based on the determination of task 330. If it is determined at task 330 that features f1 and f2 do not interact, then execution proceeds to task 350, otherwise execution continues at task 360.

At task 350, feature f2 is activated, in well-known fashion. After task 350, execution of the method of FIG. 3 terminates.

At task 360, the feature interaction is resolved. As will be appreciated by those skilled in the art, there are a variety of ways in which the feature interaction might be resolved. For example, in some embodiments of the present invention, one of the techniques described below and with respect to FIGS. 4 through 6 might be employed in order to resolve the feature interaction, while in some other embodiments of the present invention, some other technique might be employed to resolve the feature interaction. In any case, it will be clear to those skilled in the art, after reading this disclosure, how to make and use embodiments of the present invention that are capable of performing task 360.

After task 360, execution of the method of FIG. 3 terminates.

Figure 4:
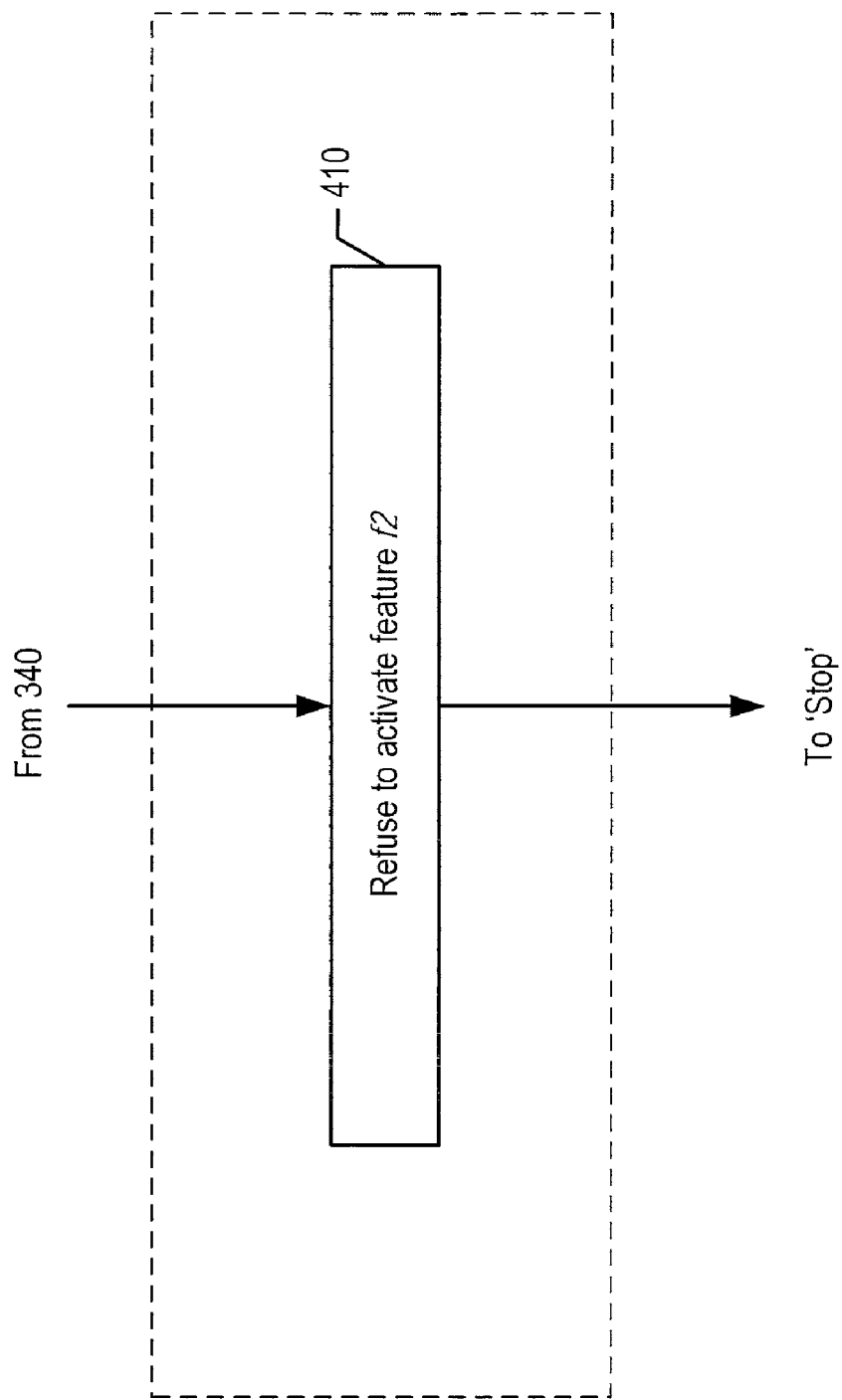
FIG. 4 depicts a flowchart of a first technique for performing task 350, as shown in FIG. 3, in accordance with the second illustrative embodiment of the present invention.

FIG. 4 depicts a flowchart of a first technique for performing task 350, in accordance with the second illustrative embodiment of the present invention. In this first technique, the feature activated earlier (i.e., feature f1) is invariantly given preference, without any other consideration (e.g., the nature of features f1 and f2, how much time has elapsed between the activation of feature f1 and the invocation of feature f2, etc.).

At task 410, activation of feature f2 is refused. As will be appreciated by those skilled in the art, in some embodiments the refusal might be accompanied by some type of notification or explanation of why feature f2 was not activated, while in some other embodiments, activation might be refused without any accompanying action.

After task 410 is completed, the technique of FIG. 4 and the method of FIG. 3 terminate.

Figure 5:
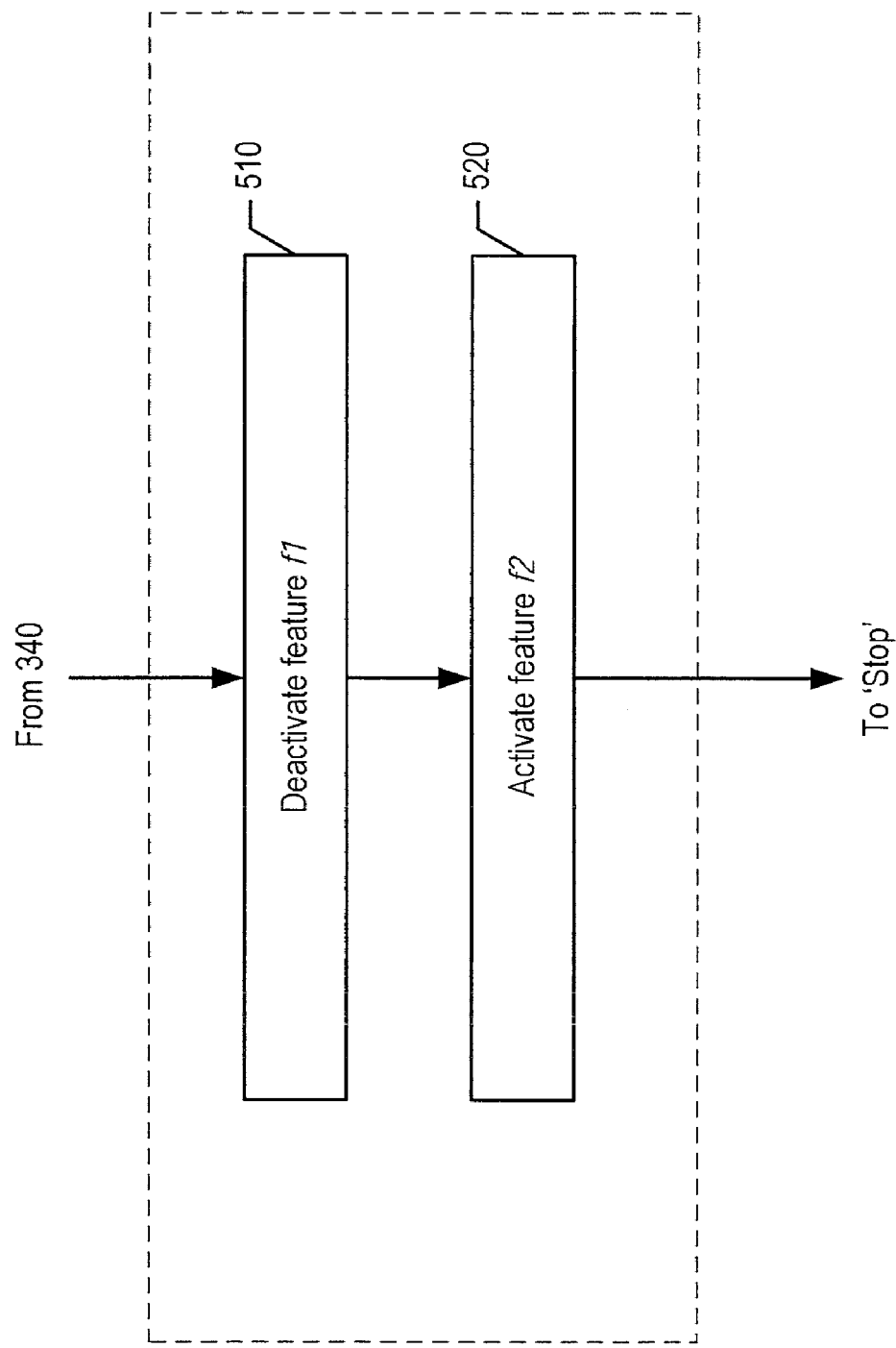
FIG. 5 depicts a flowchart of a second technique for performing task 350, in accordance with the second illustrative embodiment of the present invention.

FIG. 5 depicts a flowchart of a second technique for performing task 350, in accordance with the second illustrative embodiment of the present invention. In this second technique, the feature activated later (i.e., feature f2) is invariantly given preference, without any other consideration. It will be clear to those skilled in the art, after reading this disclosure, which tasks depicted in FIG. 5 can be performed simultaneously or in a different order than that depicted.

At task 510, feature f1 is deactivated, in well-known fashion.

At task 520, feature f2 is activated, in well-known fashion.

As will be appreciated by those skilled in the art, in some embodiments of the present invention tasks 510 and 520 might be accompanied by some type of notification or explanation of these actions, while in some other embodiments, there might not be any notification or explanation.

After task 520 is completed, the technique of FIG. 5 and the method of FIG. 3 terminate.

Figure 6:
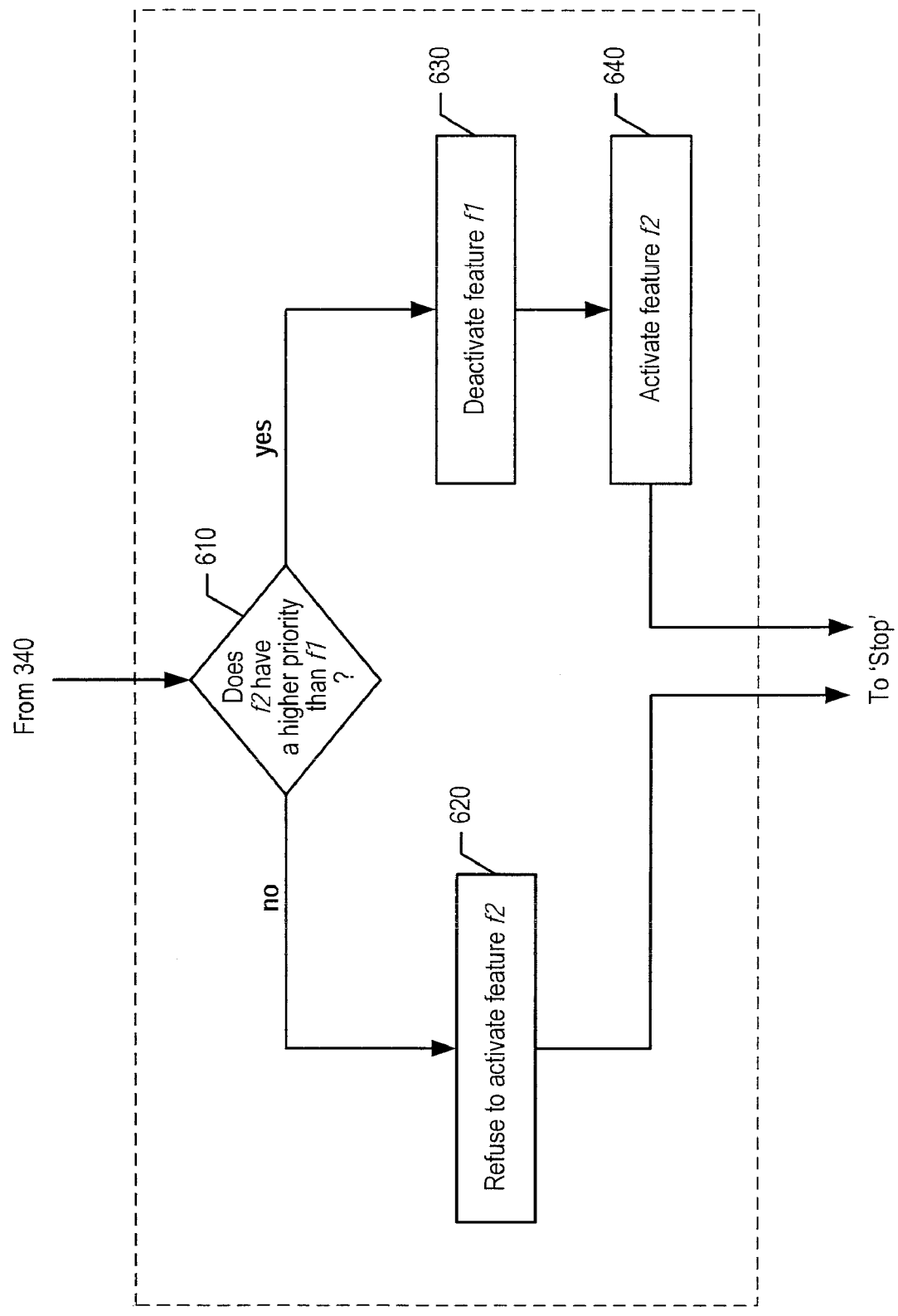
FIG. 6 depicts a flowchart of a third technique for performing task 350, in accordance with the second illustrative embodiment of the present invention.

FIG. 6 depicts a flowchart of a third technique for performing task 350, in accordance with the second illustrative embodiment of the present invention. In this third technique, feature precedence is determined via priorities that are assigned to features. It will be clear to those skilled in the art, after reading this disclosure, which tasks depicted in FIG. 6 can be performed simultaneously or in a different order than that depicted.

Task 610 checks whether feature f2 has a higher priority than feature f1. If not, execution proceeds to task 620, otherwise, execution continues at task 630.

At task 620, activation of feature f2 is refused. As will be appreciated by those skilled in the art, in some embodiments the refusal might be accompanied by some type of notification or explanation of why feature f2 was not activated, while in some other embodiments, activation might be refused without any accompanying action.

After task 620 is completed, the technique of FIG. 6 and the method of FIG. 3 terminate.

At task 630, feature f1 is deactivated, in well-known fashion.

At task 640, feature f2 is activated, in well-known fashion.

As will be appreciated by those skilled in the art, in some embodiments of the present invention tasks 630 and 640 might be accompanied by some type of notification or explanation of these actions, while in some other embodiments, there might not be any notification or explanation.

After task 640 is completed, the technique of FIG. 6 and the method of FIG. 3 terminate.

As will be appreciated by those skilled in the art, in some other embodiments of the present invention, "ties" in priority between features f1 and f2 might be broken in favor of feature f2, rather than feature f1, and it will be clear to those skilled in the art, after reading this disclosure, how to make and use such alternative embodiments.

As will be appreciated by those skilled in the art, the methods of FIGS. 3 through 6 can be implemented in conjunction with a variety of telephony platforms and protocols (e.g., Voice over Internet Protocol [VoIP] telephony based on the Session Initiation Protocol [SIP], conventional circuit-switched telephony via the Public Switched Telephone Network [PSTN], etc.), and it will be clear to those skilled in the art, after reading this disclosure, how to make and use embodiments of the present invention based on this method for such platforms and protocols.

Mid-Call Detection for Calls with Multiple-Leg Signaling Paths

The third illustrative embodiment of the present invention enables detection and resolution of feature interactions for calls with multiple-leg signaling paths. The techniques of the third illustrative embodiment can be combined with those of the first and second illustrative embodiments in order to provide mid-call feature interaction detection and resolution for multiple-leg calls that have more than two endpoints and/or bridged appearances.

Figure 7:
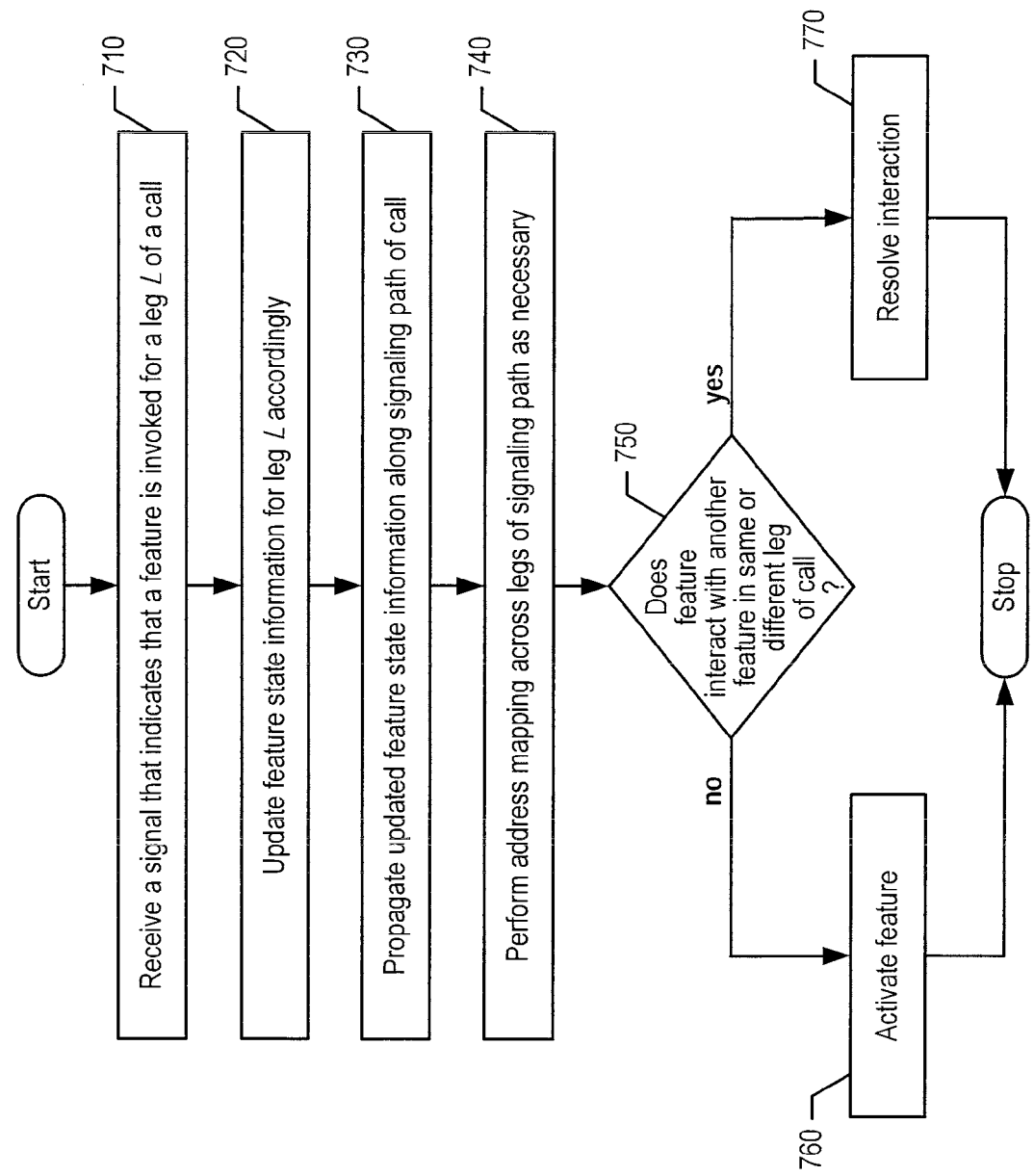
FIG. 7 depicts a flowchart for a first method of detecting and resolving feature interactions for calls with multiple-leg signaling paths, in accordance with the third illustrative embodiment of the present invention.

FIG. 7 depicts a flowchart for a first method of detecting and resolving feature interactions for calls with multiple-leg signaling paths, in accordance with the third illustrative embodiment of the present invention. It will be clear to those skilled in the art, after reading this disclosure, which tasks depicted in FIG. 7 can be performed simultaneously or in a different order than that depicted.

At task 710, a signal is received that indicates that a feature is invoked for a leg L of a call that has a multiple-leg signaling path, in well-known fashion.

At task 720, feature state information for leg L is updated accordingly and stored at the appropriate node(s) in the network. As will be appreciated by those skilled in the art, in some embodiments of the present invention the feature state information might be stored at one or more Back-to-Back User Agents (B2BUAs), as is described below and with respect to the fourth illustrative embodiment, while in some other embodiments, the feature state information might be stored at some other type of node, such as a switch, server, private branch exchange (PBX), etc. In any case, it will be clear to those skilled in the art, after reading this disclosure, how to make and use embodiments of the present invention that are capable of performing task 720.

At task 730, the updated feature state information is propagated along the signaling path of the call, in well-known fashion.

At task 740, address mapping is performed across legs of the signaling path, as necessary. For example, signaling elements along the signaling path may remove the addresses of signaling elements along portions of the path that would otherwise be carried in the signaling information. Such signaling elements can also change the address information for other signaling elements and endpoints that would otherwise be carried in the signaling information. Such mappings and transformations are used to conceal the details of the internal signaling topology from external signaling elements and endpoints, and to permit changes to signaling paths that are invisible to one or more endpoints. The address mapping at task 740 provides feature interaction detection rules with a consistent view of the endpoints that are actually in the call.

Task 750 checks whether the invoked feature interacts with either (i) a feature for a different leg of the call signaling path, or (ii) another feature for leg L. If so, then execution proceeds to task 760, otherwise execution continues at task 770.

At task 760, the feature is activated, in well-known fashion. After task 760, execution of the method of FIG. 7 terminates.

At task 770, the feature interaction is resolved. As will be appreciated by those skilled in the art, there are a variety of ways in which the feature interaction might be resolved. For example, in some embodiments of the present invention, one of the techniques described above and with respect to FIGS. 4 through 6 might be employed in order to resolve the feature interaction, while in some other embodiments of the present invention, some other technique might be employed to resolve the feature interaction. In any case, it will be clear to those skilled in the art, after reading this disclosure, how to make and use embodiments of the present invention that are capable of performing task 770.

After task 770, execution of the method of FIG. 7 terminates.

Figure 8:
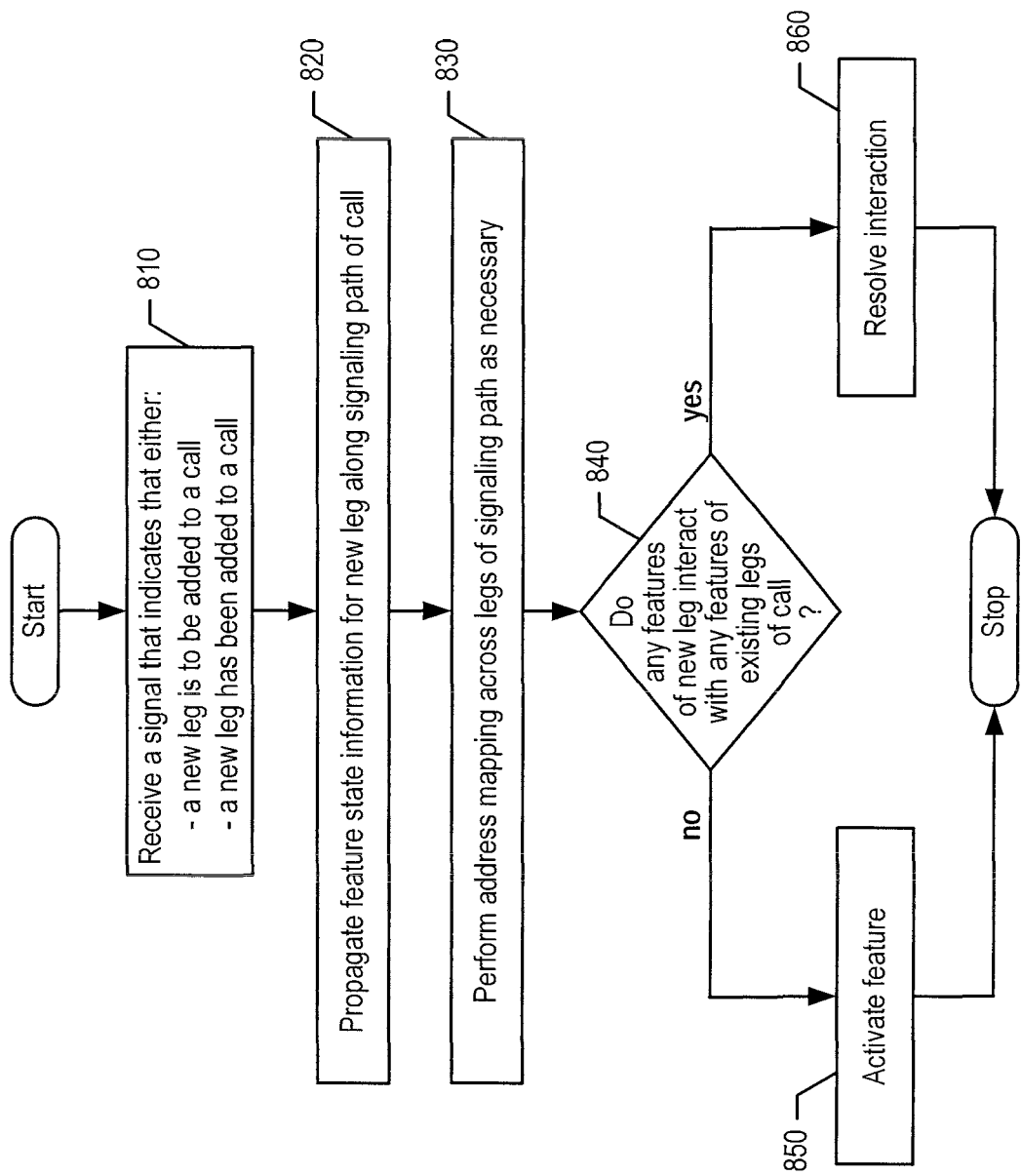
FIG. 8 depicts a flowchart for a second method of detecting and resolving feature interactions for calls with multiple-leg signaling paths, in accordance with the third illustrative embodiment of the present invention.

FIG. 8 depicts a flowchart for a second method of detecting and resolving feature interactions for calls with multiple-leg signaling paths, in accordance with the third illustrative embodiment of the present invention. It will be clear to those skilled in the art, after reading this disclosure, which tasks depicted in FIG. 8 can be performed simultaneously or in a different order than that depicted.

At task 810, a signal is received that indicates that either a new leg is to be added to a call, or that a new leg has already been added to a call.

At task 820, feature state information for the new leg is propagated along the signaling path of the call, in well-known fashion.

At task 830, address mapping is performed across legs of the signaling path, as necessary. For example, signaling elements along the signaling path may remove the addresses of signaling elements along portions of the path that would otherwise be carried in the signaling information. Such signaling elements can also change the address information for other signaling elements and endpoints that would otherwise be carried in the signaling information. Such mappings and transformations are used to conceal the details of the internal signaling topology from external signaling elements and endpoints, and to permit changes to signaling paths that are invisible to one or more endpoints. The address mapping at task 830 provides feature interaction detection rules with a consistent view of the endpoints that are actually in the call.

Task 840 checks whether any features of the new leg interact with any features of any existing legs of the call. If so, then execution proceeds to task 850, otherwise execution continues at task 860.

At task 850, the feature is activated, in well-known fashion. After task 850, execution of the method of FIG. 8 terminates.

At task 860, the feature interaction is resolved. As will be appreciated by those skilled in the art, there are a variety of ways in which the feature interaction might be resolved. For example, in some embodiments of the present invention, one of the techniques described above and with respect to FIGS. 4 through 6 might be employed in order to resolve the feature interaction, while in some other embodiments of the present invention, some other technique might be employed to resolve the feature interaction. In any case, it will be clear to those skilled in the art, after reading this disclosure, how to make and use embodiments of the present invention that are capable of performing task 860.

After task 860, execution of the method of FIG. 8 terminates.

As will be appreciated by those skilled in the art, the methods of FIGS. 7 and 8 can be implemented in conjunction with a variety of telephony platforms and protocols (e.g., Voice over Internet Protocol [VoIP] telephony based on the Session Initiation Protocol [SIP], conventional circuit-switched telephony via the Public Switched Telephone Network [PSTN], etc.), and it will be clear to those skilled in the art, after reading this disclosure, how to make and use embodiments of the present invention based on this method for such platforms and protocols.

Implementation for VoIP Using Back-to-Back User Agents

The fourth illustrative embodiment provides an implementation for Voice over Internet Protocol (VoIP) calls that is capable of performing the tasks associated with the first, second, and third illustrative embodiments described above. Thus, the fourth illustrative embodiment can handle mid-call feature interaction detection and resolution, calls with multiple-leg signaling paths, multi-party calls, and calls with bridged appearances.

The approach of the fourth illustrative embodiment is distributed in nature, which facilitates its application to Voice over Internet Protocol (VoIP) telephony and the Session Initiation Protocol (SIP). Each feature that gets activated includes its Triggering Party and Connection Type into the SIP message. If there is already one or more entries in the message, these are checked against the description of the current feature. Thus the algorithm is executed wherever necessary and a central feature manager is not required. This makes the approach highly scalable.

For the Session Initiation Protocol (SIP), the standard SIP headers do not provide sufficient detail, and therefore additional headers carrying the required information have been defined and can be included with the SIP messages. Two private headers have been defined to carry the required information for this approach: P-ConType and P-Forwarded-To. The P-ConType header contains the descriptions of features that have been active on the current session, and the P-Forwarded-To header contains the ID for an invited party when an INVITE request is redirected to another party.

During feature sequencing, the current SIP message is checked for the P-ConType header. If no such a header is found, then no other feature has previously been active and hence a feature interaction cannot have occurred. In such cases, a new P-ConType header is inserted into the message describing the current feature. For example, for a forwarding feature the header is:

```
P-ConType: ID=Forward; TP=sip:bob@d254203.com;
OrigFrom=chris@discus.com;OrigTo=bob@d254203.com;
FinalFrom=chris@discus.com;FinalTo=alice@d254203.com
```

The header contains the ID field, the triggering party and the connection type. The ID identifies the feature described in the header. The TP contains the triggering party, and the remaining four fields correspond to the four fields of the connection type.

In accordance with the fourth illustrative embodiment, Back-to-Back User Agents (B2BUAs) store and maintain feature state and signaling information for call legs, and propagate this information along the signaling path. As is well-known in the art, a Back-to-Back User Agent (B2BUA) acts as a user agent to both ends of a Session Initiation Protocol (SIP) call, and is responsible for handling all SIP signaling between both ends of the call, from call establishment to termination. To SIP clients, a Back-to-Back User Agent (B2BUA) acts as a User Agent server on one side, and as a User Agent client on the other (back-to-back) side. A Back-to-Back User Agent (B2BUA) might also provide additional functions such as call management (e.g., billing, automatic call disconnection, call transfer, etc.), network interworking (perhaps with protocol adaptation), hiding of network internals (e.g., private addresses, network topology, etc.), codec translation between two call legs, and so forth. As is also well-known in the art, a Back-to-Back User Agent (B2BUA) might be a transparent B2BUA, or a monitoring B2BUA, or might function as a session controller controller (SBC).

Transparent B2BUAs

There are two cases for transparent B2BUAs: in the first case, a transparent B2BUA might carry the P-ConType header forward as specified and be able to send back the disabling of a feature due to an interaction. This happens without altering any information in the headers.

In the second case, a transparent B2BUA modifies information in some headers, which could impact the feature interaction approach. For example, by changing the identity of the endpoints through changes in the From/To/RequestURI, the mapping between those headers and the information contained in the P-ConType header is broken. Furthermore, the P-ConType header might still reveal the 'previous' identity of the parties. Therefore the B2BUA needs to perform the same address mapping on the values in the P-ConType header as in the altered SIP headers. This mapping should happen for both upstream and downstream messages.

Figure 9:
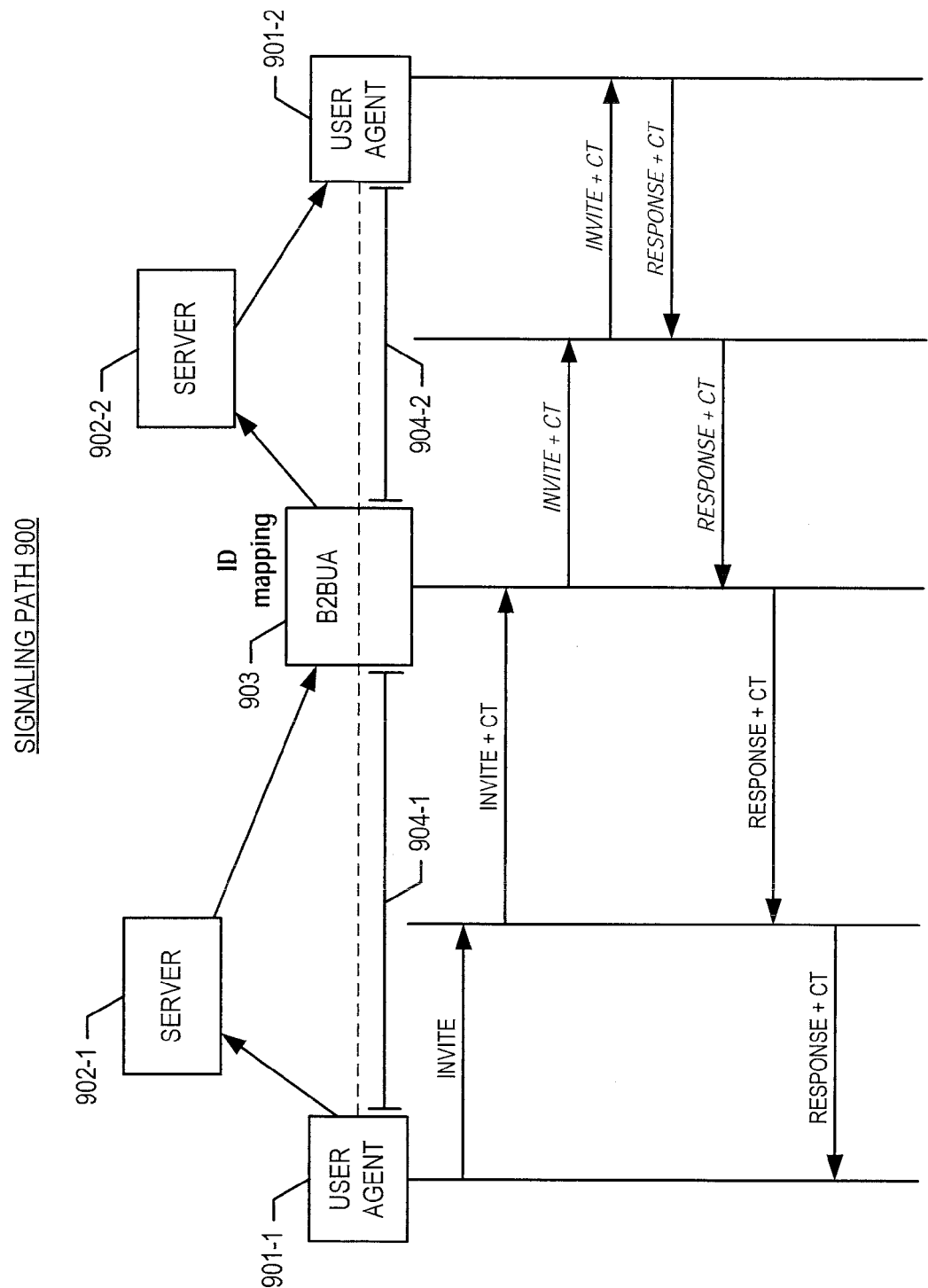
FIG. 9 depicts an illustrative signaling path comprising a transparent Back-to-Back User Agent (B2BUA), in accordance with the fourth illustrative embodiment of the present invention.

FIG. 9 depicts illustrative Session Initiation Protocol (SIP) signaling path 900 for the second case, in accordance with the fourth illustrative embodiment of the present invention. As shown in FIG. 9, signaling path 900 comprises user agents 901-1 and 901-2, servers 902-1 and 902-2, and transparent Back-to-Back User Agent (B2BUA) 903, interconnected as shown, and comprises two call legs 904-1 and 904-2.

User agents 901-1 and 901-2 are Session Initiation Protocol (SIP) endpoints, as is well-known in the art.

Servers 902-1 and 902-2 are Session Initiation Protocol (SIP) servers, as is well-known in the art.

As described above, transparent Back-to-Back User Agent (B2BUA) 103 performs address mapping on the P-ConType header as well as the other Session Initiation Protocol (SIP) headers. The Session Initiation Protocol (SIP) messages among user agents 101-1 and 101-2, servers 102-1 and 102-2, and transparent Back-to-Back User Agent (B2BUA) 103 are depicted below signaling path 900, in well-known fashion. In the case of a signaling path comprising two or more transparent B2BUAs (i.e., chained B2BUAs), the mapping occurs at each B2BUA. Thus, as will be appreciated by those skilled in the art, the behavior of chained B2BUAs can be viewed as a sequence of the single-B2BUA case.

Monitoring B2BUAs

Monitoring of a session can either be invisible (e.g. through a feature such as Lawful Intercept, etc.) or visible (e.g., through a feature such as Session Recording, etc.). Invisible monitoring should not be detectable by other endpoints in the call, and thus the signaling from the monitoring endpoint needs to be hidden from the other endpoints. B2BUAs can be employed to provide this functionality; however, there are privacy issues that might be compromised by the P-ConType header.

When monitoring is invisible with higher priority than the monitored call, features such as Lawful Intercept or Supervisor Monitoring should have priority over any feature interaction issues. In other words, the monitoring should stay invisible even though this means that some interactions due to the monitoring might not be handled. An example of such a scenario is when the monitoring party is on a screening list of one of the parties on the monitored call. In such scenarios, P-ConType headers from features for the monitoring party are not to be sent to other parties the call, and the call setup should never be repeated due to a feature interaction (disabling one of the features), as this can be detected at the other endpoints and reveal the monitoring. Instead, such an interaction is resolved by giving priority to the features of the monitoring party.

When the monitoring party is invisible with equal or lower priority than the monitored call, then monitoring should be disabled. An example of such a scenario is when monitoring is active on a call, and a party who has a feature disallowing monitoring of calls (e.g., a Chief Executive Officer, etc.) joins the call.

When monitoring is visible, privacy issues do not apply, and therefore the P-ConType header can be included in the messages in normal fashion. In addition, feature interaction resolution can be performed as described in the previous illustrative embodiments, with the added proviso that for a call leg with a B2BUA as the originating or terminating point, feature interactions within the call leg are resolved at the B2BUA.

Note that it is possible to have feature interactions across call legs of a multi-party call that cannot be made consistent. In such cases, feature interactions should be analyzed asymmetrically to the different legs.

Session Border Controllers (SBCs)

A primary function of a session border controller (SBC) is to hide domain routing and endpoint identities from external endpoints and signaling elements. Naturally, this function conflicts with the feature interaction detection approach of the fourth illustrative embodiment: in particular, a session border controller (SBC) will not forward information in the P-ConType header, as doing so might reveal identities and features used by those identities.

However, feature interaction analysis within one domain is still possible by isolating the feature interaction logic within each domain. While this will resolve interactions between services used within one domain, it will not capture interactions involving services from different domains.

Alternatively, the session border controller (SBC) could map feature interaction feedback in a way that does not disclose the internal topology or signaling. For example, there might be a list of hidden features that are filtered out of the P-ConType header to prevent visibility outside the domain. As another example, only public endpoints might be made visible outside the domain. Naturally, there is a tradeoff, as any such approach will have some impact on the ability to handle some interactions in exchange for the benefit of increased privacy. As will be appreciated by those skilled in the art, the particular policy that is employed (e.g., removal of all P-ConType headers, removal of only some P-ConType headers, handling of feature interactions only within the local domain, etc.) is an implementation decision that depends on the privacy requirements of a particular domain, and therefore it is advantageous for such policies to be configurable.

As will be appreciated by those skilled in the art, although the salient tasks of the fourth illustrative embodiment (e.g., maintaining and propagating feature state information, address mapping, etc.) are performed by one or more Back-to-Back User Agents (B2BUAs), in some other embodiments some or all of these tasks might be performed by one or more other data-processing systems (e.g., a switch, a server, a private branch exchange [PBX], etc.), and it will be clear to those skilled in the art, after reading this disclosure, how to make and use such embodiments of the present invention. As will further be appreciated by those skilled in the art, although the fourth illustrative embodiment is disclosed in the context of Voice over Internet Protocol (VoIP) telephony and the Session Initiation Protocol (SIP), the techniques of the fourth illustrative embodiment can be adapted to other types of telephony platforms and protocols, and it will be clear to those skilled in the art, after reading this disclosure, how to make and use such alternative embodiments of the present invention.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising;
identifying whether a first feature for a call that involves more than two endpoints and a second feature for the call interact, by determining whether a first set of resulting connections of the first feature and a second set of original connections of the second feature are non-disjoint and determining whether at least one of:
the first feature has a first original connection and a first resulting connection such that a first originating party of the first original connection is the same as a first terminating party of the first resulting connection, and the first terminating party of the first original connection is the same as the first originating party of the first resulting connection;
the first original connection of the first feature has the same originating party but a different terminating party as the first resulting connection of the first feature; and
a second original connection of the second feature has the same originating party but a different terminating party as a second resulting connection of the second feature.

2. The method of claim 1, wherein the second feature connects to a treatment.

3. A method comprising determining whether a first feature for a call that involves more than two endpoints and a second feature for the call interact, by determining whether a first set of original connections of the first feature equals a second set of original connections of the second feature and determining whether at least one of:
the first feature has a first resulting connection whose terminating party is treatment and a first original connection whose originating party is the same as a first triggering party of the first feature; and
the second feature has a second resulting connection whose terminating party is treatment and a second original connection whose originating party is the same as a second triggering party of the second feature.

4. A method comprising;
identifying whether a first feature for a call with an endpoint on a bridged appearance and a second feature for the call interact, by determining whether a first set of resulting connections of the first feature, comprising resulting connections with parties on bridged appearances, and a second set of original connections of the second feature, comprising original connections with parties on bridged appearances, are non-disjoint and determining whether at least one of:
a first member of the first set of original connections of the first feature, including original connections with parties on bridged appearances, has a first originating party that is the same as a first terminating party of a second member of the first set of resulting connections of the first feature;
a second terminating party of the second member that is the same as a second originating party of the second member;
the first member of the first set of original connections of the first feature, including original connections with parties on bridged appearances, has the same originating party but a different terminating party as the second member of the first set of resulting connections of the first feature; and
a third member of the second set of original connections of the second feature, including original connections with parties on bridged appearances, has the same originating party but a different terminating party as a fourth member of the second set of resulting connections of the second feature.

5. The method of claim 4 wherein the second feature connects to a treatment.

6. The method of claim 4, wherein identifying whether the first feature for the call and the second feature for the call interact further comprises:
determining whether the first set of original connections of the first feature equals the second set of original connections of the second feature; and
determining whether at least one of:
the first feature has a first resulting connection whose terminating party is treatment, and the first member of the first set of original connections of the first feature has a second originating party that is the same as a first triggering party of the first feature; and
the second feature has a second resulting connection whose terminating party is a treatment, and the third member of the second set of original connections of the second feature has a third originating party that is the same as a second triggering party of the second feature.

* * * * *